Feb. 20, 1968  O. VOIGT ET AL  3,369,973
SUPPORT GRID STRUCTURE FOR A NUCLEAR FUEL ASSEMBLY
Filed Dec. 3, 1965
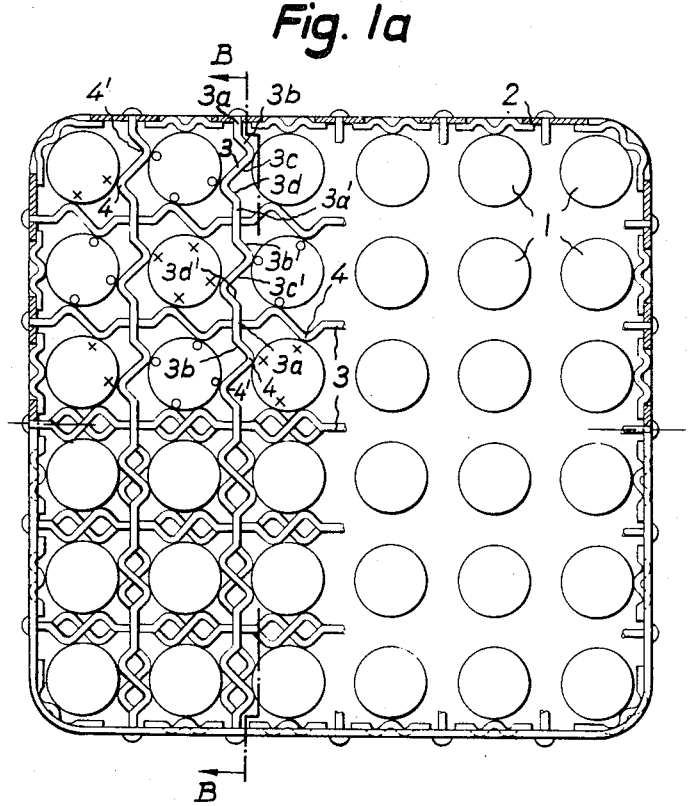
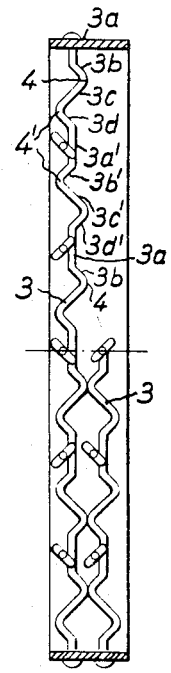
INVENTORS
Otfried Voigt &
Jochen Höchel
BY *Spencer & Kaye*
ATTORNEYS United States Patent Office 3,369,973
Patented Feb. 20, 1968

3,369,973
SUPPORT GRID STRUCTURE FOR A NUCLEAR
FUEL ASSEMBLY
Otfried Voigt, Buchschlag, and Jochen Höchel, Frankfurt am Main, Germany, assignors to Licentia Patentverwaltungs-GmbH, Frankfurt am Main, Germany
Filed Dec. 3, 1965, Ser. No. 511,458
Claims priority, application Germany, Dec. 7, 1964, L 49,471
10 Claims. (Cl. 176—78)

The present invention relates to a holding and positioning unit, particularly for holding a plurality of fuel rods in a reactor core.

Positioning units, or matrices, are generally used to support a plurality of fuel rods in a reactor core. These rods, which are generally several meters long and which are relatively thin, are arranged in several groups, and the groups are displaced from each other in the core in a direction parallel to the length of the individual rods. The positioning units mainly serve to maintain the separation between the fuel rods in each group and to attenuate lateral movements which the flow coolant in the core tends to induce in the rods.

One conventional type of positioning unit is constituted by metal bands which intersect each other at right angles and which are mounted within a box-type frame. The fuel rods are disposed among the metal bands at regular intervals and, in the regions where the metal bands pass closest to the fuel rods, metal clips are disposed on these bands. These clips constitute the elements which actually contact the fuel rods. One great disadvantage of this type of arrangement is that the various elements of the positioning unit must be manufactured to very close tolerances in order to assure that the stresses in the metal clips do not become excessive and that the surfaces of the fuel rods which may be clad, do not become damaged. The tolerances must also be very close in order to ensure that the holding forces applied to the fuel rods are not too weak. This is true because weak holding forces would permit the fuel rods to be moved slightly under the influence of extraneous forces existing in the core during the operation of the reactor and these forces would cause the fuel rods to slide with respect to their points of contact with the clips, thus creating the danger of damaging the fuel rod surfaces.

It is an object of the present invention to overcome these drawbacks.

It is a more specific object of the present invention to provide an arrangement for holding a plurality of rods in their proper positions and with the required degree of holding force.

It is another object of the present invention to provide a fuel rod holding unit which is structurally simpler and easier to manufacture than the prior art units.

In accordance with the present invention, these objects are achieved by the provision of a novel positioning unit for holding a plurality of fuel rods in proper spaced relation in a reactor core. This unit includes a substantially flat frame and a plurality of resilient wires arranged to form a matrix for receiving the fuel rods. Each of these wires has its ends connected to the frame and each has a zigzag shape for presenting a plurality of contacting points which extend transversely to a line joining the ends of the wire. In accordance with a particular feature of the present invention, each of the contacting points is arranged to bear against a respective one of the fuel rods.

Additional objects and advantages of the present invention will become apparent upon consideration of the following description when taken in conjunction with the accompanying drawings in which:

FIGURE 1a is a plan view of a positioning unit showing two preferred embodiments of the present invention.

FIGURE 1b is a cross-sectional view taken along the plane defined by the line B—B of FIGURE 1a, with the fuel rods removed for purposes of clarity.

Referring now to the drawings, there is shown a group of fuel rods disposed at regular intervals in a square pattern within a frame 2 which constitutes the frame of the holding and positioning unit. Disposed between each pair of opposing sides of the square frame 2 are a plurality of fuel rod holding wires 3 each of which is bent to follow a zigzag path. The plurality of wires 3 may be present in one layer, as is shown in the upper left-hand quadrant of FIGURE 1a and the upper half of FIGURE 1b or they may be present in two layers spaced a certain distance from one another, as shown in the lower left-hand quadrant of FIGURE 1a and the lower half of FIGURE 1b.

In order to provide the required degree of support for the fuel rods 1, several positioning units 2, 3 should be provided at regular intervals along the length of the fuel rods. For example, for fuel rods having a length of about three meters it has been found advantageous to dispose a positioning unit according to the present invention at 50 centimeter intervals along the length of the rods.

Each of the wires 3 is connected between a pair of opposed sides of the frame 2, the connections being effectuated by flattening down the ends of the wires or by welding, for example. Each of the wires 3 is given a zigzag shape and the points 4 and 4' formed by the resulting transverse projections contact, and provide the support for the fuel rods 1. The configuration of each wire 3 is defined by a succession of groups of straight portions which are bent with respect to one another in such a way as to cause all of the projection points 4 and 4' to be disposed at an equal distance from the center line of the wire, which center line extends between the centers of the points of connection of the two wire ends on the frame 2. Each group of straight portions consists of four portions 3a, 3b, 3c and 3d, or 3a', 3b', 3c' and 3d'. The portions 3a and 3a' are disposed coaxially with the center line of the wire, while the portions of 3b and 3b' are bent to the right of the center line, with respect to the view of FIGURE 1a, and the portions 3d and 3d' are bent to the left of the center line. The portions 3c and 3c' are disposed symmetrically with respect to the center line and extend transversely thereto between the points 4 and 4'.

As may best be seen in FIGURE 1b, all of the points 4 are disposed below the center line, with respect to a plane passing through the center line and extending parallel to the plane of FIGURE 1a and all of the points 4' are disposed above this plane passing through the center line. Each group of wire portions differs from the next succeeding group in that the order in which the points 4 and 4' are disposed above and below the above-described plane is inverted from one group to the next. In other words, whereas the point 4' of the group 3a-3d is disposed below the point 4 of this group, the point 4' of the group 3a'-3d' is disposed above its associated point.

Thus, each wire has a succession of fuel rod contacting points which are disposed so that two successive points 4' extend above the above-described plane and the next two successive points 4 extend below this plane.

According to a preferred form of construction of the wires of the present invention, all of the wire portions, such as 3b, 3c, 3d, 3b', 3c', and 3d' which extend transversely to the wire center line have projections in the plane of FIGURE 1b which are equiangular with the center line of the wire. This may best be seen in FIGURE 1b wherein each of the projections of these transverse portions forms an angle of approximately 30° with the center line.

It may also be seen that the two transverse wire portions between each pair of adjacent contacting points on the same side of the above-defined plane forms an angle, looking in the direction of the center line of the wire, which extends above or below the above-defined plane, and that the angle formed by the next succeeding pair of points extends in the other direction. For example, the angle formed by the portions 3d and 3b', looking in the direction of the center line of wire 3, extends above this plane, with respect to the view of FIGURE 1a, while the angle formed by the portion 3d' and the portion 3b following it extends below this plane.

In addition, the order in which the contacting points extend above and below the plane passing through the center line of the wire is inverted from one wire to the next succeeding parallel wire. Thus, in the embodiment of FIGURE 1a, the top two contacting points of the second vertical wire from the left are disposed alternately below and above this plane, as is clearly shown in FIGURE 1b, while the corresponding points of the first vertical wire from the left are alternately above and below this plane.

The above-described configuration for the wires 3 leads to the arrangement shown in FIGURE 1a wherein each point of contact of a fuel rod 1 by a point 4' disposed above the plane passing through the center line and parallel to the plane of FIGURE 1a is indicated by a circle and each point of contact by a point 4 disposed below this plane passing through the center line is indicated by an x. As may be readily seen, each fuel rod 1 is supported entirely either by points 4' extending above this plane passing through the center line, or entirely by points 4 extending below the center line. As a result, all of the points of contact to each fuel rod lie in the same plane perpendicular to the axis of the fuel rod, so that the forces applied to each fuel rod by the wires 3 do not tend to pivot these rods.

It may also be noted that the arrangement illustrated has the advantage that the torsion moments applied to the wires by the fuel rods are not transmitted, as is the case for the prior art arrangements, entirely to the frame 2, but are at least partially absorbed by other contacting points of the same wire. For example, a torsion moment applied to a point 4' disposed above the plane through the center line is partially absorbed by the reaction force applied by an adjacent rod 1 to the next succeeding point 4'.

It may also be observed that the present invention permits the wires 3 of the positioning unit to be constructed with wider tolerances because the points 4 and 4' can extend somewhat into the regions to be occupied by the fuel rods prior to the insertion of these fuel rods, these points being deflected into their proper positions when the fuel rods are inserted. The insertion of the fuel rods causes the wires to twist somewhat and the reaction created by this twisting provides the forces for holding the fuel rods. The amount of twisting experienced by the wires 3 can vary over a fairly wide range while creating reaction forces which are neither so small as to permit the fuel rods to slide with respect to the points 4 and 4' nor so large as to cause damage to the fuel rod surfaces.

In accordance with another feature of the present invention, it is also possible to weld the wires 3 together at several, or all, of their crossing points in order to produce a more rigid assembly.

When each positioning unit is to have two layers of wires, as is shown in the lower left-hand quadrant of FIGURE 1a and the lower half of FIGURE 1b, the two layers are preferably arranged so that a transverse portion of a wire in one layer is bent to the left when the corresponding portion of the wire in the other layer is bent to the right, and so that each transverse portion is bent downward when its corresponding portion in the other layer is bent upward. This arrangement is particularly advantageous because it ensures that each point of contact of a point in the upper wire layer with a particular fuel rod will be a constant distance, in a direction parallel to the fuel rod axis from the point of contact with the same rod of the corresponding wire in the other layer. In other words, if a particular fuel rod is contacted by a tip of an upper layer wire at a point below the plane through the center line of the upper layer wire, this fuel rod will also be contacted by a tip of the corresponding lower layer wire which is also below the plane through the center line of this lower layer wire.

Thus it may be seen that the present invention provides a positioning unit having a plurality of zigzag shaped wires each of which wires extends along its respective center line for a certain distance, then extends downwardly to the right for a certain distance as far as a contacting point 4, then extends upwardly to the left for a certain distance until reaching a contacting point 4', then extends downwardly to the right for a certain distance until reaching the wire center line, after which it undergoes the same series of deflections with the order of the upward and downward deflections being reserved.

Thus it may be seen that the present invention provides a relatively simple positioning element in which each layer of positioning wires 3 contacts each fuel rod at four equally space points on its circumference.

It will be understood that the above description of the present invention is susceptible to various modifications, changes and adaptations, and the same are intended to be comprehended within the meaning and range of equivalents of the appended claims.

What is claimed is:

1. A fuel rod holding and positioning unit for holding a plurality of fuel rods in proper spaced relation in a reactor core, comprising, in combination:
 (a) a substantially flat frame; and
 (b) a plurality of resilient wires arranged to form a matrix for receiving the fuel rods and each having its ends connected to said frame, each of said wires having a zigzag shape which causes said wire to present a plurality of contacting points extending transversely to a line joining the ends of said wire and to a reference plane extending parallel to the median plane of said frame, each of said points presented by each said wire being arranged to bear against a respective one of the fuel rods to be held.

2. An arrangement as defined in claim 1 wherein all of said contacting points of each said wire are equidistant from the line joining the ends of said wire.

3. An arrangement as defined in claim 1 wherein said points presented by each said wire are arranged in a plurality of pairs with both points of each pair being disposed on the same side of said reference plane, which passes through the line joining said wire ends and which extends parallel to the median plane of said frame and with each successive pair of said points being disposed alternately on opposite sides of said reference plane.

4. An arrangement as defined in claim 1 wherein said wires are welded together at at least some of the points where they intersect one another.

5. An arrangement as defined in claim 1 wherein the line joining the ends of each said wire lies in a reference plane parallel to the plane of said frame and the zigzag shape of each of said wires is defined by a plurality of groups of wire portions, each of which groups includes a first portion which extends along said line, a second portion which extends transversely to said line, and to one side thereof, up to a first contacting point, a third portion which extends from said first contacting point transversely of said line to a second contacting point on the other side of said line, and a fourth portion which extends from said second contacting point back to said line.

6. An arrangement as defined in claim 5 wherein the first and second contacting points of each of said groups each extends on a respective opposite side of said reference plane from the corresponding contacting point of the immediately adjacent group.

7. An arrangement as defined in claim 1 wherein said plurality of wires are arranged to present four contacting points for each fuel rod to be held, which points are positioned at regular intervals about the circumference of the region to be occupied by their respective fuel rod.

8. An arrangement as defined in claim 1 wherein said plurality of wires are arranged in two spaced parallel layers.

9. An arrangement as defined in claim 8 wherein each contacting point presented by a wire of one of said layers is disposed to one side of the line joining the ends of its respective wire and the corresponding contacting point presented by the wire in the other one of said layers is disposed to the respective other side of the line joining the ends of its respective wire.

10. A fuel rod holding and positioning unit for holding fuel rods in a reactor core in which a plurality of fuel rods is combined into a structural unit, said holding and positioning unit comprising spacers consisting of generally straight resilient wires which cross each other and which are bent in a zigzag shape, the planes formed by the zigzag-shaped bends of each said wire forming an angle with a plane defining the cross section of a group of fuel rods.

References Cited

UNITED STATES PATENTS

| | | | |
|---|---|---|---|
| 3,070,534 | 12/1962 | Kooistra | 176—78 |
| 3,137,638 | 6/1964 | Kumpf et al. | 176—78 |
| 3,150,057 | 9/1964 | Monson et al. | 176—78 |
| 3,255,090 | 6/1966 | Leirvik | 176—78 |

FOREIGN PATENTS

| | | |
|---|---|---|
| 1,324,796 | 3/1963 | France. |
| 1,381,787 | 11/1964 | France. |
| 1,104,082 | 4/1961 | Germany. |
| 925,154 | 5/1963 | Great Britain. |
| 969,131 | 9/1964 | Great Britain. |

CARL D. QUARFORTH, *Primary Examiner.*

M. J. SCOLNICK, *Assistant Examiner.*